United States Patent [19]

Ryder et al.

[11] Patent Number: 4,848,023
[45] Date of Patent: Jul. 18, 1989

[54] FISHING LURE

[75] Inventors: Francis E. Ryder, Arab; Joseph V. Ranalletta, Guntersville, both of Ala.

[73] Assignee: Ryder International Corporation, Arab, Ala.

[21] Appl. No.: 152,165

[22] Filed: Feb. 4, 1988

[51] Int. Cl.⁴ ............................................. A01K 83/06
[52] U.S. Cl. ..................................... 43/44.2; 43/44.4; 43/44.6; 43/41
[58] Field of Search ................ 43/41, 44.2, 44.4, 44.6, 43/44.8

[56] References Cited

U.S. PATENT DOCUMENTS

| | | | |
|---|---|---|---|
| 2,196,376 | 4/1940 | Anderson | 43/44.2 |
| 2,359,410 | 10/1944 | Edwards | 43/41 |
| 2,461,755 | 2/1949 | Miller | 43/41 |
| 2,467,971 | 4/1949 | Frair | 43/41 |
| 2,518,593 | 8/1950 | Bell | 43/44.2 |
| 2,582,646 | 1/1952 | Moore | 43/44.2 |
| 2,763,086 | 9/1956 | Johnson et al. | 43/44.2 |
| 2,848,836 | 8/1958 | Dodd | 43/44.6 |
| 3,645,031 | 2/1972 | Egles | 43/44.2 |
| 3,914,896 | 10/1975 | Sahagian | 43/44.6 |
| 4,067,135 | 1/1978 | Martin | 43/44.2 |

FOREIGN PATENT DOCUMENTS

| | | | |
|---|---|---|---|
| 87471 | 7/1966 | France | 43/44.4 |
| 155523 | 12/1920 | United Kingdom | 43/44.2 |
| 468605 | 7/1937 | United Kingdom | 43/44.2 |

Primary Examiner—Kurt Rowan
Attorney, Agent, or Firm—R. A. Giangiorgi

[57] ABSTRACT

A fishing lure for use with dead bait fish includes a cover having a cavity for insertion of the head portion of the bait fish and an anchor means for securing the cover on the bait fish. Also connected to the cover is a foil or diving plane which deflects water to create lateral motion of the lure and bait fish in relation to the direction of the trolling advancement of the lure through the water, so that the lure produces simulated swimming animation of the dead bait fish and promotes attraction of the target fish. Two hooks are linked to extend rearwardly from the cover by respective, opposing branches of a Y-shaped lead extension which is secured within the cover. The Y-shaped lead extension guides alignment of the hooks into positions flanking the opposite sides of the bait fish. The cover can be articulated and vertically split, with cover portions which pivot between a separated, open position in which the head of the bait fish is inserted, and a closed position in which cover portions are pivoted together to anchor the fish head within the articulated cover. The cover halves can be provided with projecting barbs which pierce and anchor the head of the inserted bait fish. The articulated cover has a hinge structure at the nose portion to enable the pivotal motion of the cover halves. A locking structure is provided to secure the cover halves together in the closed position.

11 Claims, 2 Drawing Sheets

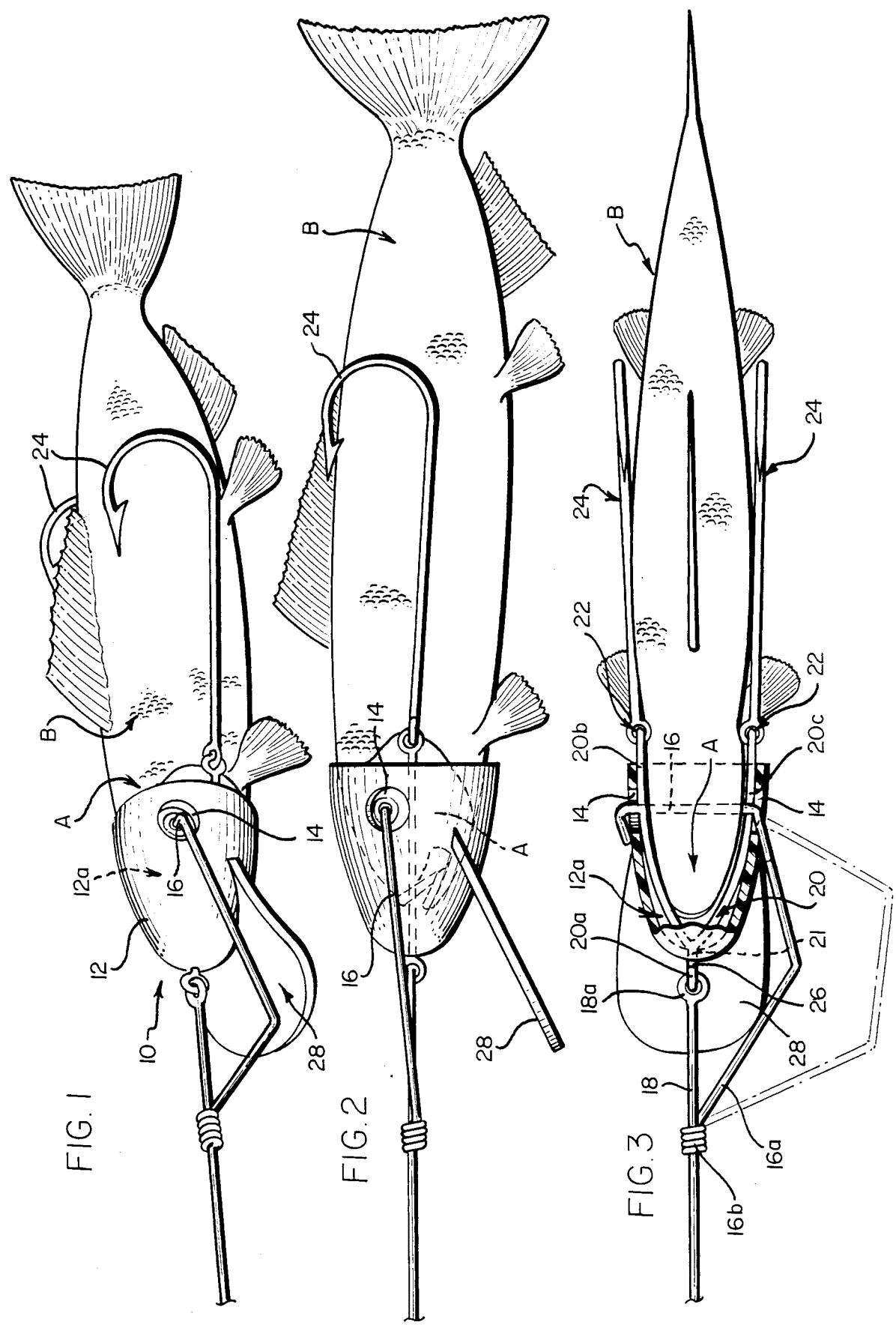

FISHING LURE

BACKGROUND OF THE INVENTION

This invention relates to fishing lures, and more particularly relates to lures designed for use with dead bait fish.

The handling convenience to fishermen in using frozen natural bait such as typical cigar minnows of approximately 7 or 8 inches, and similar bait fish, has a major drawback in that the dead bait fish is trolled through the water in a lifeless manner often unattractive to target fish. In the attempt to improve the attraction to target fish, bright metallic lures having a fish head-shaped cover have been placed over dead bait fish using a safety pin to secure the head of the bait fish within a metal cover. With this lure the fish hook is connected to the metallic cover and the hook is merely dragged along the side of the bait fish. The hook is often knocked aside by the striking target fish which takes the bait without hookup. In contrast, the lure according to the subject invention not only produces attractive animation of dead bait fish, but is also conveniently anchored to the bait fish and stabilizes the hook for effective hookup of target fish.

SUMMARY OF THE INVENTION

The fishing lure in accordance with the subject invention includes a cover means having a cavity for insertion of the head portion of a bait fish or the like and an anchoring means for securing the cover on the bait fish. Also connected to the cover is a foil or diving plane which deflects water to create lateral motion of the lure and bait fish in relation to the direction of the trolling advancement of the lure through the water, so that the lure produces simulated swimming animation of the dead bait fish and promotes attraction of the target fish. The lure is provided with linkage to connect the cover to the fish hook. Preferably, two hooks are linked to extend rearwardly from the cover by respective, opposing branches of a Y-shaped lead extension which is secured within the cover. The Y-shaped lead extension guides alignment of the hooks into positions flanking the opposite sides of the bait fish.

In a preferred embodiment, the cover of the lure is articulated and vertically split, with pivotal cover portions. The cover portions pivot between a separated, open position in which the head of the bait fish is inserted, and a closed position in which cover portions are pivoted together to anchor the fish head within the articulated cover. The cover halves can be provided with projecting barbs which pierce and anchor the head of the inserted bait fish. The articulated cover has a hinge structure at the nose portion to enable the pivotal motion of the cover halves. A locking structure is provided to secure the cover halves together in the closed position. The locking structure includes a latch member which releasably retains abutment of latch stubs respectively formed on the pivotal cover members. The latch member projects from the diving plane which is pivotally supported on the articulated cover so that the diving plane swings away from or into operating position below the articulated cover. The diving plane is retained in the operating position by a snap fit of the latch means which locks abutment of the latch stubs in the closed position of the articulated cover.

BRIEF DESCRIPTION OF THE PREFERRED EMBODIMENTS

FIG. 1 is a perspective view of a first embodiment of a lure in accordance with the invention, illustrating a bait fish secured to the lure;

FIG. 2 is a side elevation of the lure and fish shown in FIG. 1;

FIG. 3 is a top plan view, partially in section, of the lure and fish shown in FIGS. 1 and 2, and illustrating the linkages within the cover portion of the lure which extend to guide a pair of hooks;

DESCRIPTION OF THE PREFERRED EMBODIMENTS

Figure 4:
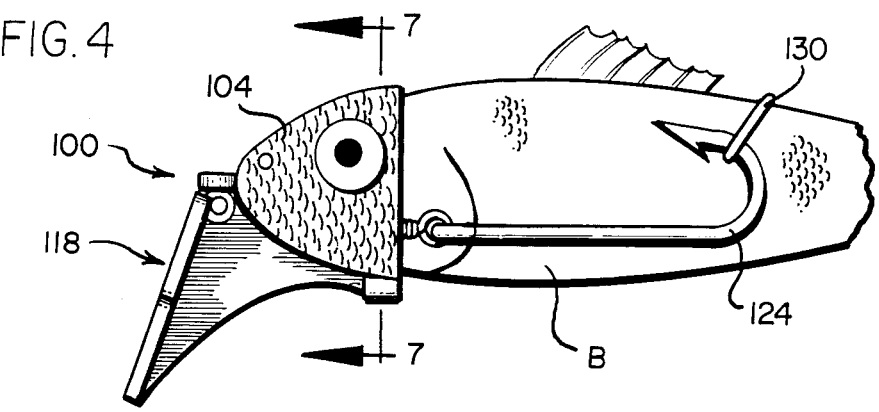
FIG. 4 is a side elevation view of a second embodiment of a lure in accordance with the invention.

Referring to FIGS. 1–3, an embodiment of the fishing lure of the subject invention which produces swimming animation of dead bait fish is generally designated by reference character 10. The fishing lure 10 includes a hollow cover or cap 12 within which an open cavity 12a is formed to receive the head portion A of a dead bait fish, generally designated B, for example a minnow. The cap 12 can be fabricated from light metal or plastic and includes a pair of lateral, oppositely aligned through apertures 14. The aligned apertures 14 are sized and located to facilitate passing a generally rigid, anchoring pin from one aperture 14 through the eye sockets or adjacent portion of the skull of the bait fish B to secure the head portion A within the cap 12 as best illustrated in FIG. 3.

The illustrated lure 10 includes a lead wire 18 with an eye loop 18a which is interconnected with the eye loop 20a at the base end of a Y-shaped lead extension generally designated 20. The opposing branches 20b and 20c of the Y-shaped lead extension are secured within the cap cavity 12a adjacent the respective, opposing side walls of the cap 12 so that the inserted fish head A is positioned between the branches. The branches project rearwardly from the cap 12 and are respectively linked by eyes 22 to a pair of hooks 24. The branches 20a and 20b guide the hooks 24 into preferred alignment flanking the opposite sides of the fish B. The hooks 24 can be coupled by a rubber band in the manner shown in FIG. 4, in order to hold the hooks against the sides of the fish.

The Y-shaped lead extension 20 has a base portion 21 which projects forwardly through an end aperture 26 in the cap 12, and extends to an eye link 21a. The pin 16 can have an extension 16a with a jointed linkage 16b to the lead 18.

The cap 12 has an integrally formed diving plane or bill 28 which obliquely projects forwardly from the underside of the cap 12. The bill 28 deflects water and creates lateral motion of the lure 10 and inserted fish B in relation to the direction of trolling advancement of the lure 10 through the water to create simulated swimming animation of the dead fish B.

Figure 5:
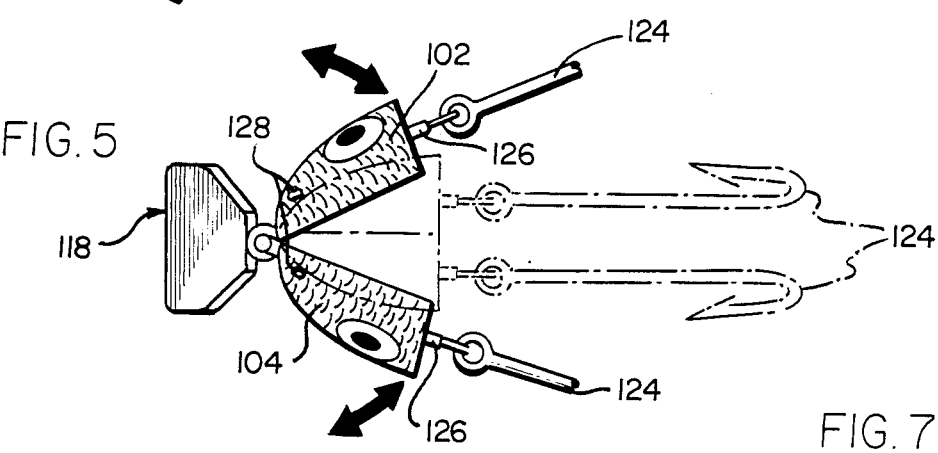
FIG. 5 is a top plan view of the lure shown in FIG. 4, and illustrating open and closed positions of the articulated cover.
Figure 8:
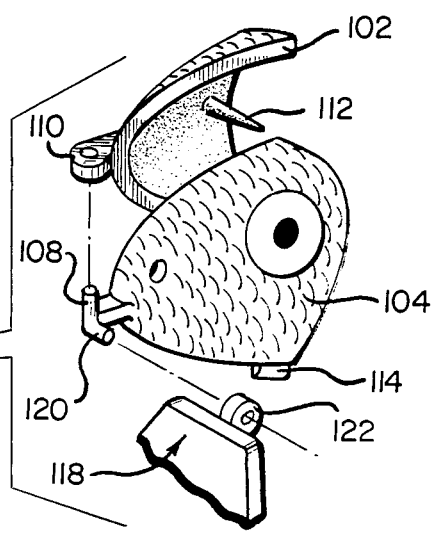
FIG. 8 is a partial, exploded view of the lure shown in FIGS. 4–7 and illustrating the hinge structure of the articulated cover and diving plane.

Referring to FIG. 4, a second embodiment of the lure is generally designated by reference character 100. The lure 100 includes an articulated cap having vertically split cap halves 102 and 104 as shown in FIG. 5. As best shown in FIG. 8, the cap halves 102 and 104 are coupled by a hinge structure 106 at the nose portions. The hinge structure 106 includes a vertically extending hinge pin 108 which is integral with, and preferably molded with, the cap half 104; the hinge pin 108 pivots within the aperture of the hinge bearing 110 which is integral with the cap half 102.

Figure 7:
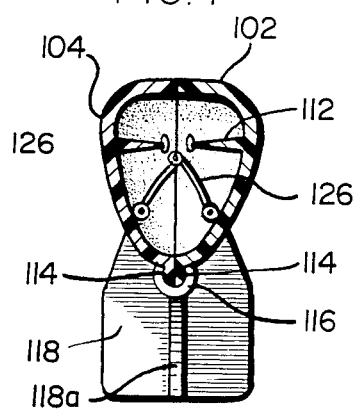
FIG. 7 is a sectional view taken along line 7—7 in FIG. 4 and in the indicated direction.
Figure 6:
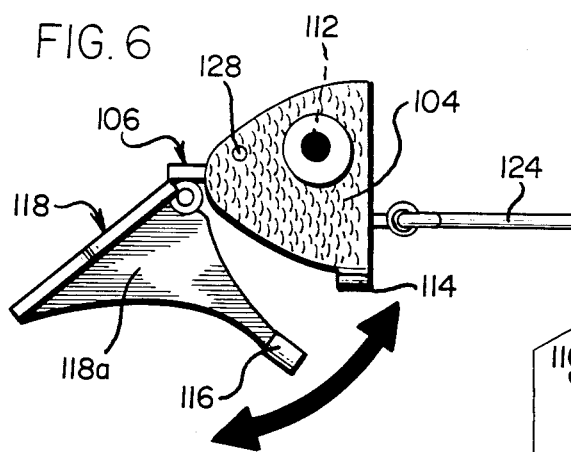
FIG. 6 is a side elevation of the lure shown in FIG. 4, and illustrating pivotal motion of a diving plane hinged on the nose of the cover.

In the open position of the cap halves shown in FIG. 5, the head portion A of the bait fish B can be inserted between the open halves 102 and 104 which are then pivotally closed together to clamp the fish head therebetween; as shown in FIG. 7 with the fish absent, each cap half 102 and 104 has an inwardly projecting barb 112 which pierces the skull of the fish, preferably through the eyes, to anchore the fish within the closed cap. Each of the cap halves 102, 104 has a latch stub 114 projecting downwardly from the lower portion of the respective cap halves so that in the closed position illustrated in FIG. 7 the stubs 114 abut in parallel; a pivoting latch 116 can then be snapped around both of the stubs 114 to maintain the abutment of the stubs 114 and lock the closed position of the articulated cap. The locking snap action is facilitated by the arcuate configuration of the latch 116 which conforms to curves outer surfaces of the respective stubs 114.

The latch 116 defines the free end of a rearwardly projecting brace portion 118a formed on a pivotal diving plane or bill 118 which is preferably fabricated from clear plastic. In the locking position of the latch 116, the bill 118 produces the trolling animation of the lure 100 similar to the motion of the bill 28 of the first lure embodiment 10. The pivotal bill 118 is hinged to the articulated cap by providing a hinge pin 120 extending horizontally from the vertical hinge pin 108 as best shown in FIG. 8. The upper portion of the bill 118 has an apertured bearing 122 which is pivotally supported on the hinge pin 120 so that pivotal motion of the bill 118 allows locking or unlocking the latch 116 against the stubs 114 to open or close the articulated cap.

As shown in FIG. 5, a pair of rearwardly extending hooks 124 are respectively linked to lead members 126 which are secured within the respective cap halves 102 and 104. As best shown in FIG. 5, the illustrated embodiment of the articulated cap has aligned apertures 128 through each of the respective cap halves 102, 104 through which the main leader line (not shown) can be passed to tie the lure 100. Referring to FIG. 4, the hooks 124 can be coupled, for example with a rubber band 130, to flank the sides of the bait fish for trolling.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A fishing lure for producing swimming animation of a dead bait fish or the like, comprising; an articulated cover means having a cavity for insertion therein of the head portion of said fish, and comprising longitudinally separable and pivotally connected cover portions which pivot away from each other to an open position is which said fish is inserted between said cover portions, and pivot toward each other into engagement with each other in a closed position in which said fish is anchored within said cover portions; anchor means for securing said fish between said cover portions; linkage means for connecting said cover means to a fish hook; and foil means connected to said cover means for deflecting water to create lateral motion of said lure and fish in relation to the direction of trolling advancement of the lure through the water.

2. A lure according to claim 1 wherein said articulated cover means is vertically split defining said pivotal cover portions.

3. The lure according to claim 1 wherein said anchor means comprises barbed means projecting inwardly from at least one of said cover portions for piercing the head portion of said fish.

4. The lure according to claim 1 wherein said articulated cover means includes a locking structure securing said cover portions together in a closed position of said cover means.

5. A fishing lure for producing swimming animation of a dead bait fish or the like, comprising; an articulated cover means having a cavity for insertion therein of the head portion of said fish, and comprising pivotally connected cover portions which pivot between an open position in which said fish is inserted between said cover portions, and a closed position in which said fish is anchored within said cover portions, wherein said pivotal cover portions are coupled by a hinge structure formed at forward, nose portions thereof; anchor means for securing said fish between said cover portions; linkage means for connecting said cover means to a fish hook; and foil means connected to said cover means for deflecting water to create lateral motion of said lure and fish.

6. The lure according to claim 5 wherein said hinge structure includes a vertically extending hinge pin formed on one of said cover portions and a hinge bearing pivotally supporting said pin and formed on the other of said cover portions.

7. A fishing lure for producing swimming animation of a dead bait fish or the like, comprising; an articulated cover means having a cavity for insertion therein of the head portion of said fish, and comprising pivotally connected cover portions which pivot between an open position in which said fish is- inserted between said cover portions, and a closed position in which said fish is anchored within said cover portions, wherein said articulated cover means includes a locking structure securing said cover portions together in a closed position of said cover means and wherein said locking structure comprises a latch stub projecting from each of said respective cover portions, said latch stubs being abutted in said closed position; anchor means for securing said fish between said cover portions; linkage means for connecting said cover means to a fish hook; and foil means connected to said cover means for deflecting water to create lateral motion of said lure and fish.

8. The lure according to claim 7 wherein said locking structure further comprises a latch member releasably retaining said abutment of said latch stubs.

9. The lure according to claim 8 wherein said latch member is pivotally supported on said cover means.

10. The lure according to claim 9 wherein said pivotally supported latch member is mounted on a pivotal diving plane defining said foil means.

11. The lure according to claim 10 wherein said diving plane is pivotally supported on said cover means and wherein said diving plane is positioned in said water-deflecting position when said latch member is located in said stub-retaining position of said locking structure.

* * * * *